(12) United States Patent
Liao

(10) Patent No.: US 7,231,748 B2
(45) Date of Patent: Jun. 19, 2007

(54) ADJUSTING DEVICE OF FILM PACKAGING MACHINE

(75) Inventor: Benker P. C. Liao, Taipei (TW)

(73) Assignee: Benison & Co., Ltd., Taipei (TW)

( * ) Notice: Subject to any disclaimer, the term of this patent is extended or adjusted under 35 U.S.C. 154(b) by 14 days.

(21) Appl. No.: 11/072,236

(22) Filed: Mar. 7, 2005

(65) Prior Publication Data

US 2006/0196149 A1    Sep. 7, 2006

(51) Int. Cl.
  *B65B 53/00*  (2006.01)
(52) U.S. Cl. .................. 53/389.1; 53/296; 53/585; 493/478; 493/479
(58) Field of Classification Search .............. 53/389.1, 53/585, 291, 296, 64; 493/477–479
  See application file for complete search history.

(56) References Cited

U.S. PATENT DOCUMENTS

| | | | | |
|---|---|---|---|---|
| 4,565,592 A | * | 1/1986 | Wehrmann et al. ........... 156/64 |
| 4,765,121 A | * | 8/1988 | Konstantin et al. ........... 53/442 |
| 4,914,893 A | * | 4/1990 | Strub et al. ................... 53/567 |
| 4,922,683 A | * | 5/1990 | Connolly ..................... 53/296 |
| 5,531,858 A | * | 7/1996 | Hong .......................... 156/556 |
| 5,737,900 A | * | 4/1998 | Konstantin et al. ........... 53/295 |
| 5,791,220 A | * | 8/1998 | Liao ............................. 83/364 |
| 6,070,399 A | * | 6/2000 | Huang et al. ................. 53/585 |
| 6,684,599 B1 | * | 2/2004 | Fresnel ......................... 53/64 |
| 6,776,366 B2 | * | 8/2004 | Tschesche ................. 241/101.2 |
| 7,028,452 B2 | * | 4/2006 | Liao ............................. 53/557 |
| 2002/0112451 A1 | * | 8/2002 | Pritchard ..................... 53/451 |
| 2003/0084643 A1 | * | 5/2003 | Shen ........................... 53/298 |
| 2003/0084772 A1 | * | 5/2003 | Shen ........................... 83/597 |
| 2005/0241279 A1 | * | 11/2005 | Hsieh .......................... 53/585 |
| 2006/0042198 A1 | * | 3/2006 | Liao ............................ 53/557 |
| 2006/0090624 A1 | * | 5/2006 | Chen ........................... 83/651 |

* cited by examiner

*Primary Examiner*—Thanh Truong
(74) *Attorney, Agent, or Firm*—Rosenberg, Klein & Lee

(57) ABSTRACT

An adjusting device that is mounted in a film packaging machine includes a moving mechanism that selectively moves two support blocks in opposite directions and toothed wheels mounted to the support blocks in a symmetric manner and driven by a timing belt that is mechanically coupled to a motor for rotating film drive rollers that are mounted to selected ones of the toothed wheels. Thus, the film drive rollers are movable in opposite directions with the support blocks for adjusting the distance between the rollers, which allows for accommodation of packaging films of different sizes between the rollers, while not interfering with the operation of the film drive roller for driving the packaging film therebetween. This arrangement allows for uniform application of driving force to the film by the film drive rollers and thus realizing smooth and stable movement of the film in packaging an article.

5 Claims, 7 Drawing Sheets

ADJUSTING DEVICE OF FILM PACKAGING MACHINE

BACKGROUND OF THE INVENTION

1. Field of the Invention

The present invention generally relates to a film packaging machine that comprises two rollers on opposite sides of a cylindrical member over which a tubular packaging film is fit for physically engaging and driving the film, and in particular to an adjusting device for adjusting the distance between the rollers to accommodate tubular film sections of different dimensions.

2. The Related Art

Heat-shrinkage films are widely used to package a variety of consumer products, such as beverage bottles/jars, food cans, optic disc packs, and even books, and to provide a surface cover of these consumer products with information or patterns, such as advertisements and decorations, printed or otherwise formed thereon. The films are often made in a length of tube that is then expanded by a packaging machine for fitting over an article to be packaged. Heat is then applied to shrink and the film for tightly wrapping around the article.

The conventional film packaging machine is often a bulky facility combined in a production line. The film packaging machine must be adjusted for films of different sizes that are used to package article of different sizes. The adjustment is cumbersome and complicated, which leads to high expenses.

Taiwan Patent Publication No. 211592 and U.S. Pat. No. 5,791,220 both disclose a film packaging machine comprising a flexible coupling connected to two film drive rollers in order to allow lateral adjustment of distance between the rollers. However, the adjustment is limited to the flexibility of the coupling and large distance adjustment is not possible. This is not helpful in accommodating the packaging machine to films of widely varied sizes. Further, the coupling is easily damaged due to fatigue. Constant maintenance is required, which leads to a great amount of maintenance expense. Further, the forces applied to the film by the rollers are not uniform, which leads to un-smooth movement of the film and wrinkling of the film when the film is fit over the article to be packaged.

Other references, such as UN Patent No. 5,531,858, disclose facility and technology for adjusting the diameter of the member over which the tubular film is fit, which comprises a complicated transmission for the film drive rollers that drives the film. Again, the force applied to the film by the rollers is not uniform, leading to un-smooth movement and wrinkling of the film.

It is thus desired to provide a device for adjusting the film drive rollers of the film packaging machine that also provides smooth movement of the film by applying uniform driving force to the film, in order to overcome the problems encountered in the prior art.

SUMMARY OF THE INVENTION

Therefore, a primary objective of the present invention is to provide an adjusting device of film packaging machine, which comprises a moving mechanism that moves two movable members that rotatably supports film drive rollers in opposite directions whereby distance between the rollers can be adjusted by moving the movable members toward/ away from each other for accommodating packaging films of different sizes.

Another objective of the present invention is to provide an adjusting device comprising two members that are movable in opposite directions and carrying a plurality of toothed wheels coupled to and driven by a timing belt that extends around the toothed wheel to uniformly apply a driving force to a packaging film by film drive rollers that are rotated by the toothed wheels.

To achieve the above objectives, in accordance with the present invention, an adjusting device that is mounted in a film packaging machine comprises a moving mechanism that selectively moves two support blocks in opposite directions and toothed wheels mounted to the support blocks in a symmetric manner and driven by a timing belt that is mechanically coupled to a motor for rotating film drive rollers that are mounted to selected ones of the toothed wheels. Thus, the film drive rollers are movable in opposite directions with the support blocks for adjusting the distance between the rollers, which allows for accommodation of packaging films of different sizes between the rollers, while not interfering with the operation of the film drive roller for driving the packaging film therebetween. This arrangement allows for uniform application of driving force to the film by the film drive rollers and thus realizing smooth and stable movement of the film in packaging an article.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENT

Figure 1:
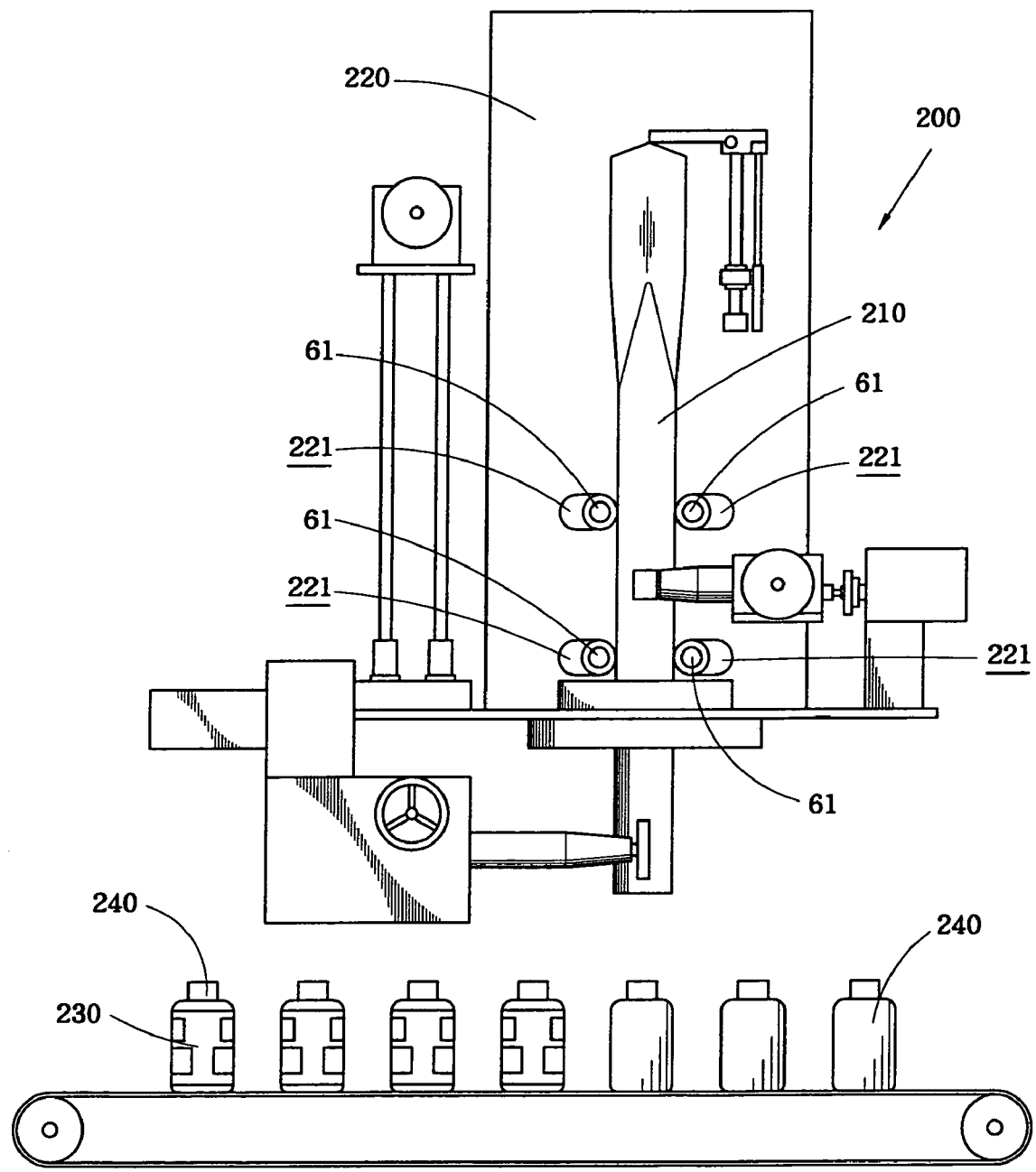
FIG. 1 is a front view of an adjusting device in accordance with the present invention incorporated in a film packaging machine, with a distance between film drive rollers of the machine being set to a minimum.
Figure 2:
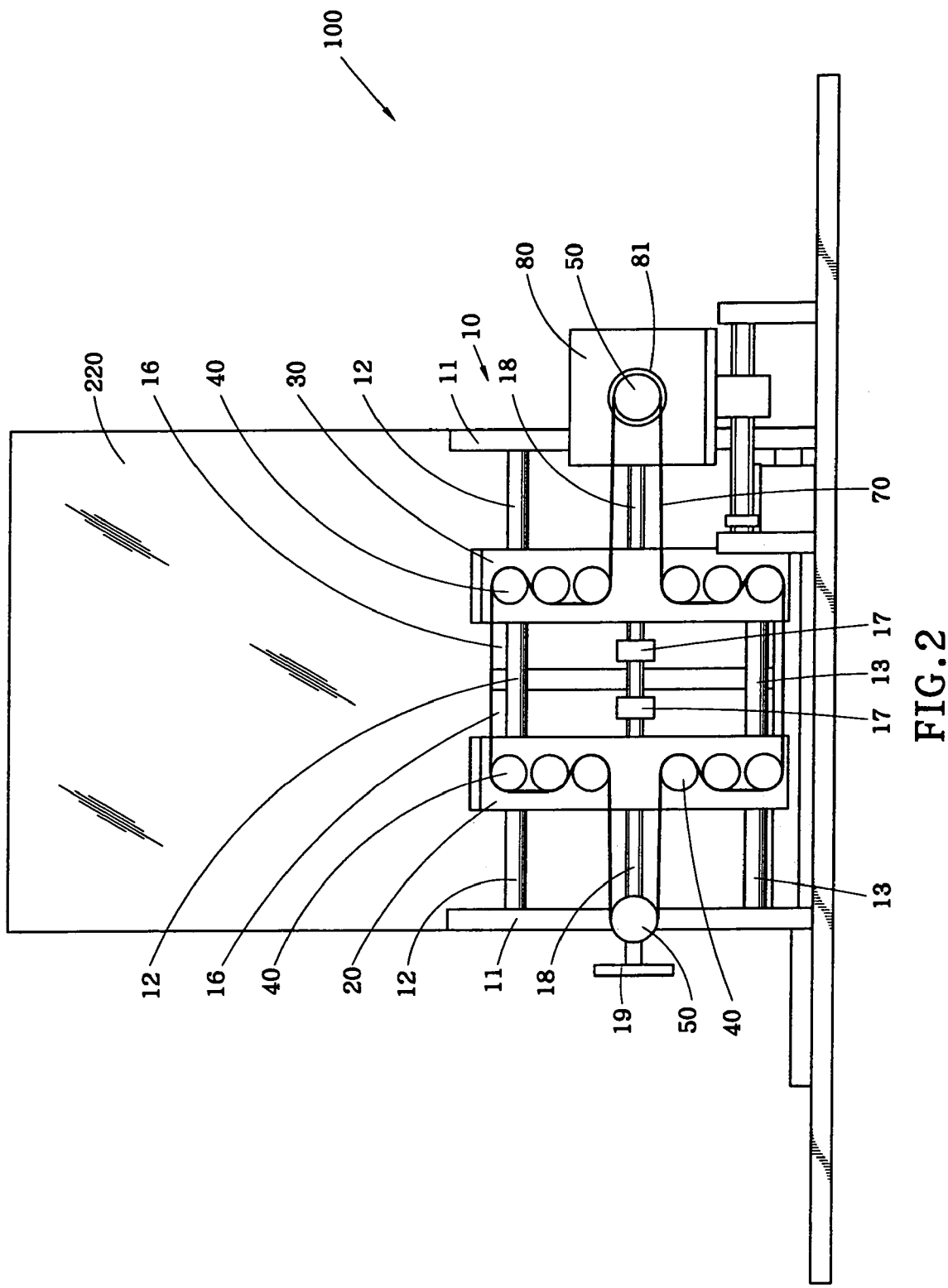
FIG. 2 is a rear view of the adjusting device in accordance with the present invention.
Figure 3:
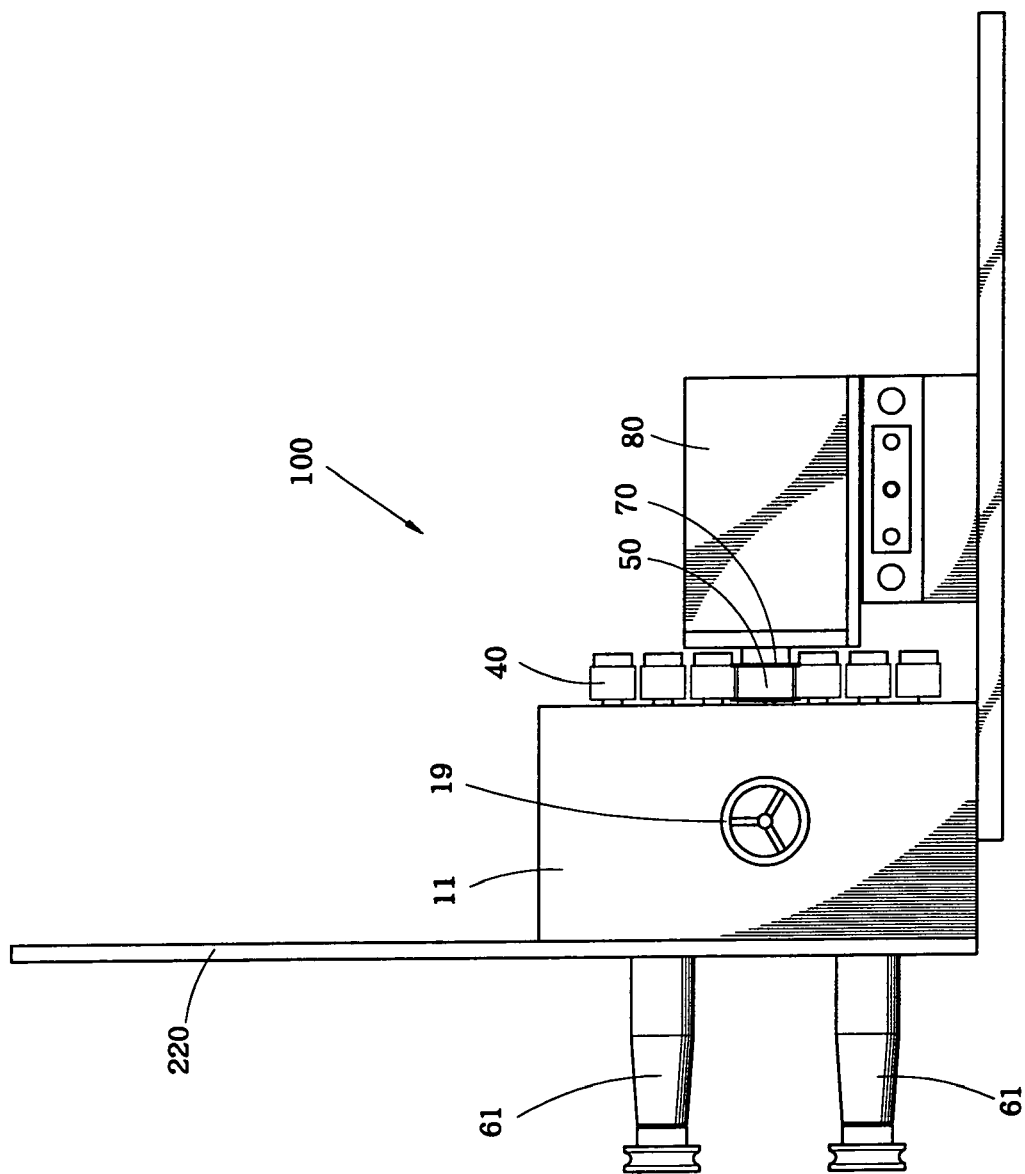
FIG. 3 is a side elevational view of the adjusting device of the present invention.
Figure 4:
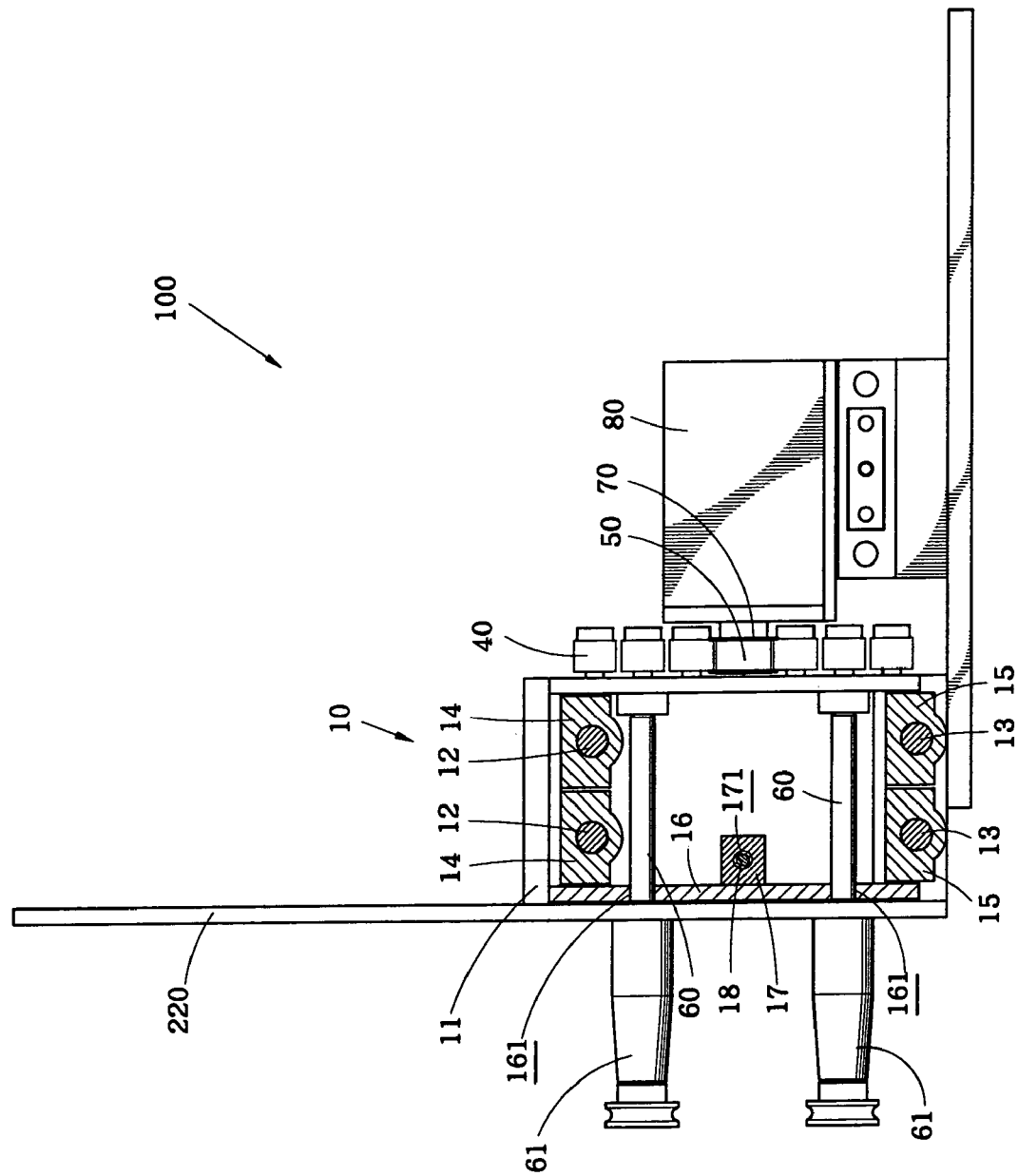
FIG. 4 is a cross-sectional view of the adjusting device of the present invention showing a moving mechanism thereof.

With reference to the drawings and in particular to FIGS. 1–4, an adjusting device constructed in accordance with the present invention, generally designated with reference numeral 100 is incorporated in a film packaging machine 200 for adjusting the distance between film driving rollers of the machine 200. It is noted that the distance is set to a minimum in FIG. 1, and maximum in FIG. 7. The film packaging machine 200 is constituted, in part, by a panel 220 that divides the film packaging machine 200 into a front space in which a film expansion cylinder 210 is arranged in a vertical direction and an opposite rear space in which the adjusting device 100 is arranged. Pairs of elongated slots 221 are defined in the panel 220 and each pair is comprised of two slots 221 respectively located on opposite sides of the vertical film expansion cylinder 210 and extending in a lateral direction. Each slot 221 movably and rotatably supports a film drive roller 61 whereby the film drive rollers 61 are on the opposite sides of the film expansion cylinder 210 and in physical engagement with an outer surface of the film expansion cylinder 210. In operation, a tubular film section 230 is fit over and thus expanded by the film expansion cylinder 210 in order to readily fit over an article 240 to be packaged. The article 240 is conveyed under the film expansion cylinder 210 and the tubular film section 230 fit over the film expansion cylinder 210 is driven downward by the film drive rollers 61 to fit over the article 240 below the film expansion cylinder 210.

To accommodate film section 230 of larger sizes, the film expansion cylinder 210 is replaced by one having a larger diameter. This requires the distance between the two rollers 61 of each pair to be increased in accordance with the larger diameter of the film expansion cylinder 210. The adjusting device 100 of the present invention is operatively coupled to the film drive rollers 61 for selectively adjusting the distance between the two rollers 61 of each pair in order to accommodate the replacement of the film expansion cylinder 210 that has the larger diameter.

The adjusting device 100 comprises a moving mechanism 10 that selectively moves the film drive rollers 61 of each pair toward/away from each other to change the distance between the film drive rollers 61. The moving mechanism 10 comprises a casing 11 that is arranged behind and fixed to the panel 220 of the film packaging machine 200. The casing 11 is comprised of two spaced side walls between which upper and lower rails 12, 13 extend laterally for movably supporting upper and lower slides 14, 15, respectively, whereby the slides 14, 15 are movable laterally, which is substantially parallel to the panel 220. At least one pair of plates 16, including a left plate and a right plate, extends between and is fixed to the upper and lower slides 14, 15, whereby when the slides 14, 15 moves in the lateral direction, the plates 16 move in unison therewith. Holes 161 are defined in the plates 16 at positions corresponding to the slots 221 of the panel 220 of the film packaging machine 200.

Two movable blocks 17, including a left movable block and a right movable block, are mounted to the plates 16 respectively and defines inner-threaded bores 171. A screw rod 18 laterally extends between the side walls of the casing 11, running through the inner-threaded bores 171 of the movable blocks 17 to form threading engagement therewith, which is arranged so that when the screw rod 18 rotates, the two movable blocks 17, and thus the two plates 16, as well as the slides 14, 15 attached to the plates 16, are moved laterally in opposite directions in order to cause the film drive rollers 61 to approach or separate from each other. One end of the screw rod 18 is provided with a hand wheel 19 or other manual rotation device for manually rotating or otherwise rotating the screw rod 18.

Figure 5:
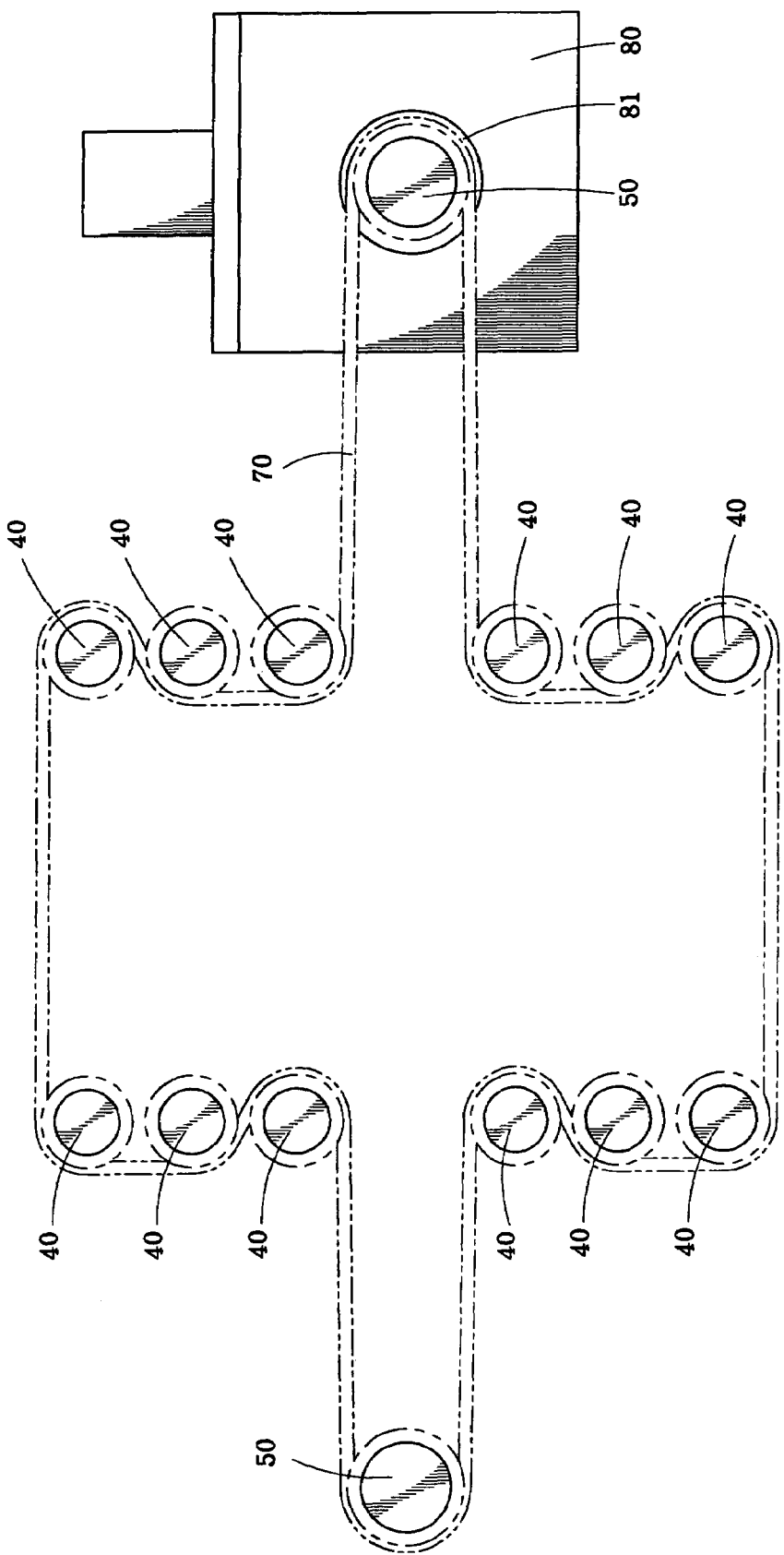
FIG. 5 shows the arrangement among movable toothed wheels, fixed toothed wheels, a timing belt, and a motor of the adjusting device of the present invention.

Left and right support blocks 20, 30 are mounted to the slides 14, 15 and are opposite to the plates 16 whereby when the slides 14, 15 are caused to move along the rails 12, 13 by the rotation of the screw rod 18, the left support block 20 and the right support block 30 are moved laterally in unison therewith. Toothed wheels 40 are rotatably mounted to rear faces of the support blocks 20, 30 in a left-right symmetric manner, which is particularly shown in FIG. 5. In each support block 20, 30, two groups of three toothed wheels 40 that are arranged in line in the vertical direction are mounted. Thus, the toothed wheels 40 are laterally movable in unison with the support blocks 20, 30.

An endless timing belt 70 having opposite toothed surfaces extends around and matingly engages the toothed wheels 40. Two fixed toothed wheels 50 are fixed to the casing 11 on opposite sides of the movable toothed wheels 40, preferably fixed to the side walls of the casing 11 or portions of the film packaging machine 200. The timing belt 70 also extends around the fixed toothed wheels 50 to serve as a transmission between the fixed toothed wheels 50 and the movable toothed wheels 40. One of the fixed toothed wheels 50 is driven by a motor 80. Preferably, the fixed toothed wheel 50 is mounted to a spindle 81 of the motor 80 whereby the motor 80 rotates the fixed toothed wheel 50, which in turn drives the timing belt 70 to induce rotation of the movable toothed wheels 40. The arrangement between the toothed wheels 40, 50 and the timing belt 70, as that shown in FIGS. 2 and 5, allows the movable toothed wheels 40 to move laterally with the support blocks 20, 30, while transmitting the rotational force of the motor 80 through the belt 70 to the movable toothed wheels 40. However, it is apparent to those having ordinary skills to replace the arrangement with a different one while preserving the same functions of the arrangement shown in FIGS. 2 and 5. The number and locations of the movable toothed wheels 40 can, of course, be varied.

Figure 7:
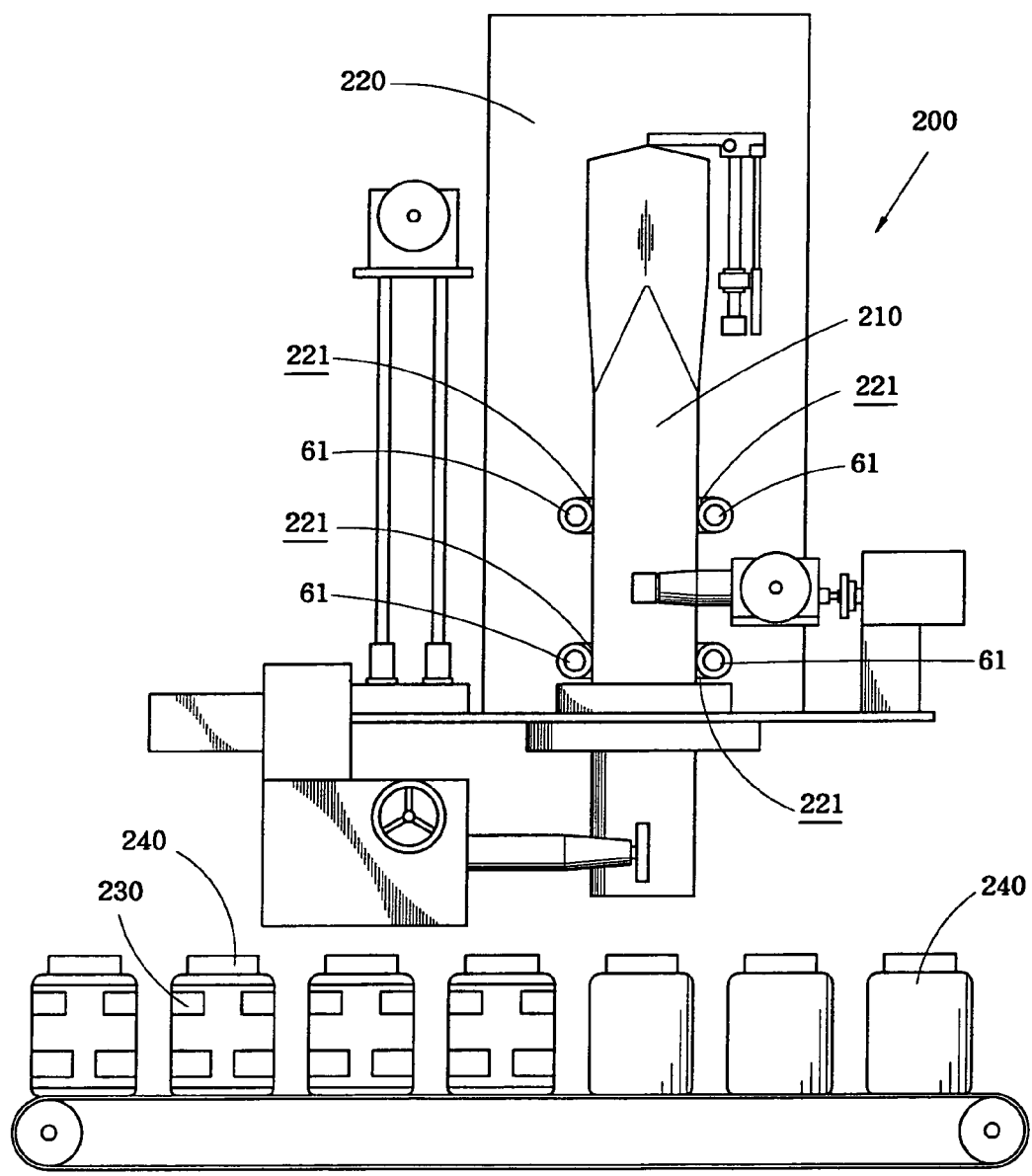
FIG. 7 is similar to FIG. 1, but showing the distance between film drive rollers is increased to a maximum.

Rotary shafts 60 are mounted to selected ones of the toothed wheels 40 and are rotatable in unison with the selected toothed wheels 40. The shafts 60 extend through and, preferably are rotatably supported by, the holes 161 of the plates 16. Ends of the shafts 60 extend through the elongated slots 221 of the panel 220 to support the film drive rollers 61 respectively. Thus, the rotation of the motor 80 is transmitted through the fixed toothed wheel 50, the timing belt 70, and the movable toothed wheels 40 to the film driving rollers 61. The elongated slots 221 of the panel 220 allows the lateral movement of the shafts 60 that is moved with the support blocks 20, 30 in opposite directions and thus, as shown in FIGS. 1 and 7, opposite ends of the elongated slots 221 form stops for the lateral movement of the shafts 60 and the support blocks 20, 30 and correspond to maximum and minimum distances between the film drive rollers 60. By increasing the lateral length of the slots 221, the adjustability of distance between the rollers 60 can be enhanced. This is apparent to those having ordinary skills.

Figure 6:
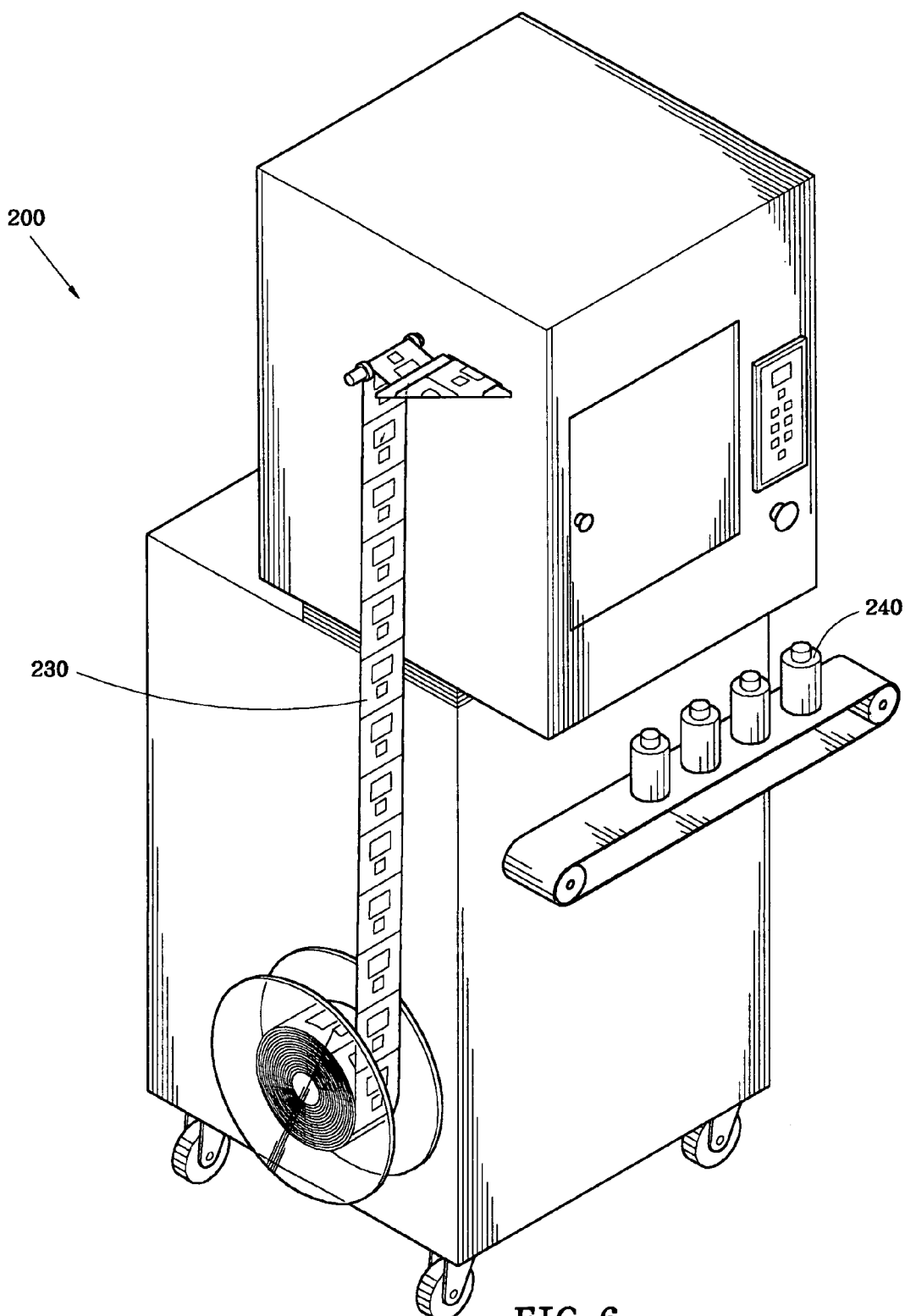
FIG. 6 is a perspective view of a film packaging machine in which the adjusting device of the present invention is incorporated.

Also referring to FIGS. 6 and 7, to operate, a long strip of packaging film comprised of a number of tubular film sections 230 lined up one by one is advanced by the film packaging machine 200 to sequentially fit over and thus be expanded by the film expansion cylinder 210. The motor 80 drives the fixed and movable toothed wheels 40, 50, which in turn rotate the film drive rollers 61 via the shafts 60. Friction engagement between the film drive rollers 61 and the tubular film section 230 fit over the film expansion cylinder 210 drives the film 230 downward when the rollers 61 rotate. The expanded tubular film section 230 is thus forwarded to and fit over the article 240 to be packaged below the film expansion cylinder 210.

For articles 240 that require packaging films 230 of different sizes, the film expansion cylinder 210 is replaced by one that fits the different size of the packaging film 230 to ensure the friction engagement between the film drive rollers 61 and the film 230 fit over the film expansion cylinder 210. The hand wheel 19 is rotated, which in turn moves the support blocks 20, 30 with respect to each other via the threading engagement between the screw rod 18 and the movable blocks 17 and the driving chain between the plates 16 and slides 14, 15 that move along the rails 12, 13. The rollers 61 are thus moved toward or away from each other to accommodate the different size of the film expansion cylinder 210. FIG. 7 illustrates a film expansion cylinder that has a diameter greater than that of the device shown in FIG. 1.

The adjusting device 100 of the present invention features the tight and firm engagement between the timing belt 70 and the toothed wheels 40, 50 even when the movable toothed wheels 40 are moved laterally with respect to the fixed toothed wheels 50. This ensures stable transmission of torque from the motor 80 to each film drive roller 61, which in turn results in a smooth and stable movement of the film section 230 along the film expansion cylinder 210 toward the article 240 to be packaged for uniform driving forces are applied to the film section 230 by all the film drive rollers 61. Quality and performance of the operation of film packaging can be enhanced.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. An adjusting device adapted to be arranged in a film packaging machine, the adjusting device comprising:
   a moving mechanism mounted to the film packaging machine, the moving mechanism being adjustable to accommodate film expansion members of different size in the film packaging machine;
   two support blocks mechanically coupled to and driven by the moving mechanism to move in opposite directions;
   a plurality of toothed wheels each rotatably mounted to a surface of one of the support blocks to be movable in unison therewith, at least two film drive rollers for driving film along the film expansion member, the film drive rollers being coupled at one side of the support blocks to at least two shafts extending from selected ones of the toothed wheels disposed at an opposing side of the support blocks;
   two fixed toothed wheels rotatably supported on the film packaging machine to be rotatable substantially in coplanar manner relative to the toothed wheels on the support blocks;
   a shared timing belt extending endlessly about and matingly engaging each of the toothed wheels on the support blocks and each of the fixed toothed wheels, wherein the timing belt includes dual toothed surfaces on opposing sides thereof engageable with the toothed wheels; and
   a motor mechanically coupled to one of the fixed toothed wheels whereby torque/rotation induced by the motor is transmitted through the timing belt and the toothed wheels to the shafts.

2. The adjusting device as claimed in claim 1, wherein the moving mechanism comprises:
   a casing fixed to the film packaging machine and comprising two side walls spaced from each other;
   rails extending between the side walls in a direction parallel to the movement of the support blocks with respect to each other;
   two slides movable along the rails and fixedly supporting the support blocks respectively, whereby the support blocks are movable in unison with the slides;
   two plates mounted to the two slides respectively to be movable in unison therewith;
   two moving blocks respectively mounted to the plates to be movable in unison therewith and defining inner-threaded holes;
   a screw rod mating engaging with and extending through the inner-threaded holes, the screw rod and the inner-threaded holes of the moving blocks being arranged in such a way that when the screw rod rotates, the moving blocks move in opposite directions along the screw rod; and
   a rotating member mounted to an end of the screw rod for selectively rotating the screw rod.

3. The adjusting device as claimed in claim 2, wherein the plates define holes through which the shafts extend.

4. The adjusting device as claimed in claim 1, wherein each shaft has an end to which a film drive roller is formed for engaging and driving a film that is provided by the film packaging machine for packaging an article.

5. The adjusting device as claimed in claim 1, wherein at least one of the toothed wheels on the support blocks is adjustably varied in linear separation from each of the fixed toothed wheels responsive to movement of the support blocks.

* * * * *